United States Patent
Kim et al.

(10) Patent No.: US 9,428,104 B2
(45) Date of Patent: Aug. 30, 2016

(54) LAMP FOR VEHICLE

(71) Applicant: SL Corporation, Daegu (KR)

(72) Inventors: Yong Hwan Kim, Gyeongbuk (KR);
Hyo Jin Han, Gyeonsangbuk (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 14/645,159

(22) Filed: Mar. 11, 2015

(65) Prior Publication Data

US 2015/0258931 A1    Sep. 17, 2015

(30) Foreign Application Priority Data

Mar. 14, 2014  (KR) ................. 10-2014-0030059

(51) Int. Cl.
| | |
|---|---|
| *F21V 7/00* | (2006.01) |
| *B60Q 1/26* | (2006.01) |
| *B60Q 1/38* | (2006.01) |
| *B60R 1/12* | (2006.01) |
| *F21S 8/10* | (2006.01) |

(52) U.S. Cl.
CPC ............ *B60Q 1/2665* (2013.01); *B60Q 1/38* (2013.01); *B60R 1/1207* (2013.01); *F21S 48/215* (2013.01); *F21S 48/218* (2013.01); *F21S 48/2206* (2013.01); *F21S 48/232* (2013.01); *F21S 48/234* (2013.01); *F21S 48/238* (2013.01)

(58) Field of Classification Search
CPC ........ B60Q 1/26; B60Q 1/2665; B60Q 1/38; B60R 1/1207; F21S 48/215; F21S 48/218; F21S 48/234; F21S 48/238; F21S 48/24
See application file for complete search history.

(56) References Cited

U.S. PATENT DOCUMENTS

| | | | |
|---|---|---|---|
| 6,511,192 B1* | 1/2003 | Henion ............... | B60Q 1/2665 248/476 |
| 7,347,598 B2 | 3/2008 | Seguchi | |
| 7,717,596 B1* | 5/2010 | Bell ..................... | B60R 1/1207 362/459 |
| 2009/0046475 A1* | 2/2009 | Weller ................ | B60Q 1/2665 362/494 |
| 2011/0001428 A1* | 1/2011 | Rodriguez Barros ................ | B60Q 1/2665 315/77 |
| 2011/0149585 A1 | 6/2011 | Dubosc | |
| 2011/0157907 A1 | 6/2011 | Hwang | |
| 2011/0235353 A1* | 9/2011 | Fukasawa ........... | B60Q 1/2665 362/494 |

FOREIGN PATENT DOCUMENTS

| | | |
|---|---|---|
| DE | 10 358183 A1 | 7/2005 |
| DE | 10 2011119231 A1 | 5/2013 |
| KR | 101232302 B1 | 2/2013 |

* cited by examiner

*Primary Examiner* — Peggy Neils
*Assistant Examiner* — Alexander Garlen
(74) *Attorney, Agent, or Firm* — Mintz Levin Cohn Ferris Glovsky and Popeo, P.C.; Kongsik Kim; Colleen H. Witherell

(57) ABSTRACT

Provided is a lamp for a vehicle comprising a housing having a mirror mounted therein and a signal lamp provided on a surface of the housing. The signal lamp includes a reflecting portion, a lens unit located in front of the reflecting portion and including a half mirror formed on at least a portion of a surface of the lens unit, a supporting portion located between the reflecting portion and the lens unit, and a light source unit including a plurality of light sources. The signal lamp forms an original image of the light source unit and one or more reflected images obtained by reflecting the original image.

11 Claims, 11 Drawing Sheets

LAMP FOR VEHICLE

CROSS-REFERENCE TO RELATED APPLICATION

This application claims priority to Korean Application No. 10-2014-0030059 filed on Mar. 14, 2014, the disclosure of which is herein incorporated by reference in its entirety.

BACKGROUND

1. Technical Field

The present invention relates to a lamp for a vehicle, and more particularly to a lamp for a vehicle capable of forming predetermined repeated images through a signal lamp provided in an outside mirror for a vehicle.

2. Description of the Related Art

Most vehicles are equipped with lamps or lights for illuminating purpose (e.g., headlamps and fog lamps) or signaling purpose (e.g., turn signal lamps, tail lamps, brake lamps, and side marker lamps). Halogen lamps or high-intensity discharge (HID) lamps have been used as light sources. In recent years, light-emitting diodes (LEDs) have been increasingly used as light sources for vehicle lamps or lights for many reasons. For example, as LEDs have a similar color temperature to that of sunlight, i.e., a color temperature of about 5,500 K, they are known to cause less fatigue to the human eyes than other light sources. In addition, as LEDs can be miniaturized, they can improve the degree of freedom of the design of vehicle lamps or lights. Moreover, as LEDs have semi-permanent lifetime, they are highly economical. Consumers consider not only the functional aspects (such as securing a clear view for safety driving) but also the aesthetic aspects of vehicle lamps or lights in deciding which vehicle to buy.

There continues to be a need for further innovation in vehicle lamps that can satisfy functional aspects and aesthetic aspects.

SUMMARY

According to an aspect of the present invention, there is provided a lamp for a vehicle comprising a housing having one surface on which a mirror is mounted, and a signal lamp provided on one surface of the housing. The signal lamp comprises a reflecting portion, a lens unit located in front of the reflecting portion to be spaced apart from the reflecting portion by a constant distance, a half mirror being formed on at least one surface of the lens unit, a supporting portion having an opening of a predetermined size and located between the reflecting portion and the lens unit, and a light source unit including a plurality of light sources disposed along a peripheral edge of the opening. The signal lamp forms an original image of the light source unit and one or more reflected images obtained by reflecting the original image.

Lamps according to the present invention provide various advantages. For example, it is possible to improve design aspects of the exterior of a vehicle. Also, it is possible to improve visibility of a repetition image by varying the location of a light source unit of a signal lamp depending on the location of installation of the signal lamp. In addition, it is possible to render a variety of images of repetition by adjusting the distance between a light source unit of the signal lamp and a reflection unit and a half mirror that are on either side of the light source unit. Further, it is possible to render an undistorted repetition image by making either end of the light source unit of the signal lamp lie on a normal line to an inside surface of a lens unit.

Lamps according to the present invention are not restricted to those set forth herein. Lamps according to the above and other exemplary embodiments of the invention will be or become apparent to one of ordinary skill in the art to which the invention pertains upon review of the following drawings and detailed description below. It is intended that all such additional lamps be included within this description, be within the scope of the present invention, and be protected by the accompanying claims.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
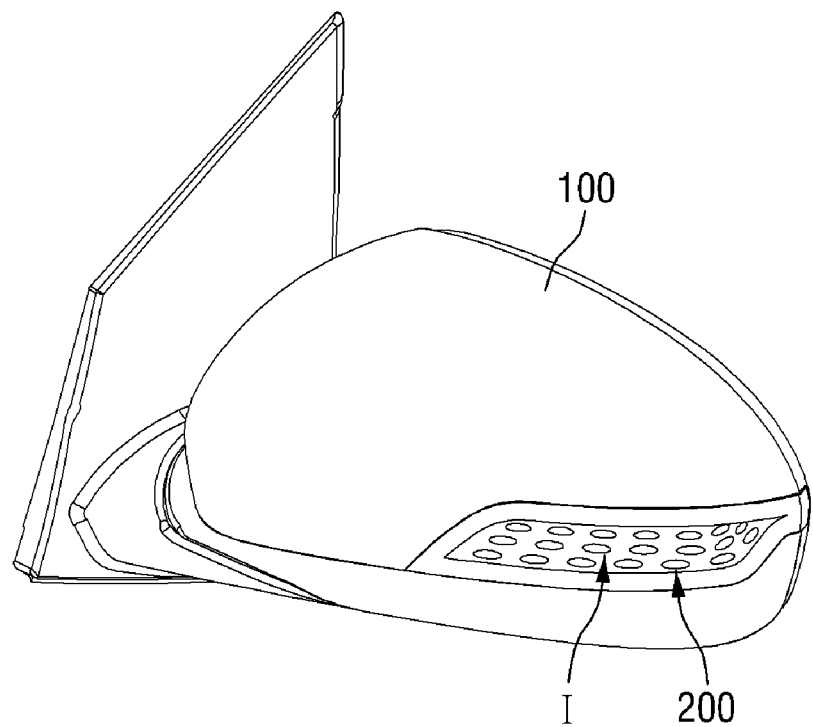
FIG. 1 is a perspective view showing a lamp for a vehicle according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

In some embodiments, well-known steps, structures and techniques will not be described in detail to avoid obscuring the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation.

Hereinafter, a lamp for a vehicle according to embodiments of the present invention will be described with reference to the drawings.

FIG. 1 is a perspective view showing a lamp for a vehicle according to an embodiment of the present invention.

As shown, a vehicle lamp 1 according to an embodiment of the present invention may include a mirror housing 100 with a mirror mounted therein and a signal lamp 200 provided at an outer surface of the mirror housing 100.

In the embodiment of the present invention, a case where the signal lamp 200 is provided in an outside mirror and the signal lamp 200 is formed on the front side of the mirror housing 100 will be described by way of example, but the present invention is not limited thereto. In another embodiment, the signal lamp 200 may be formed on the lateral side of the mirror housing 100, or may be formed to extend from the front side to the lateral side of the mirror housing 100.

Further, in the embodiment of the present invention, a case where the signal lamp 200 is used as a turn signal lamp, a position lamp, or the like will be described by way of example, but the present invention is not limited thereto. In another embodiment, the signal lamp 200 may be used for a variety of purposes such as informing an ambient vehicle, a pedestrian or the like about a driving state of the vehicle.

In the embodiment of the present invention, the signal lamp 200 may form a light pattern having a plurality of images I. As one example, as shown in FIG. 1, a plurality of dot images having similar sizes/shapes may be arranged in a predetermined direction or directions and may be repeated in a predetermined pattern to thereby form a light pattern having multiple, repeated images I.

The repeated images I may be formed to have different brightness levels. As one example, as shown in FIG. 1, if the images are formed repeatedly toward the inside of the signal lamp 200 from the outside thereof, the outside image of the signal lamp 200 may have the highest brightness and the images of the signal lamp 200 may be formed to have the brightness which decreases in the inward direction.

Hereinafter, the signal lamp 200 according to the embodiment of the present invention will be described in detail.

Figure 2:
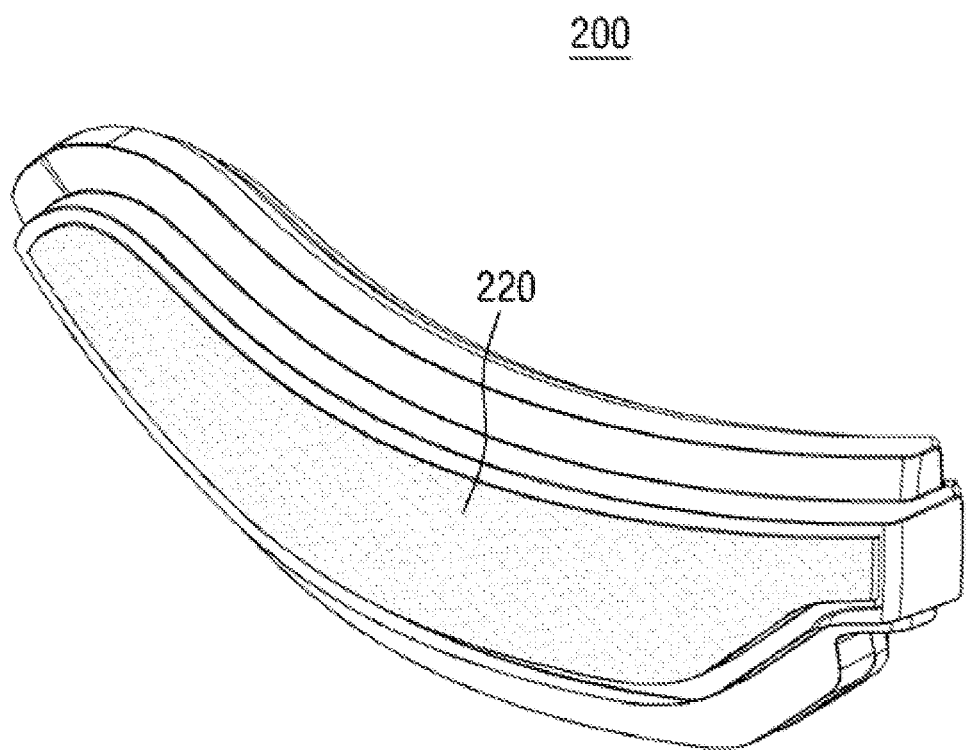
FIG. 2 is a perspective view of a signal lamp according to the embodiment of the present invention.
Figure 3:
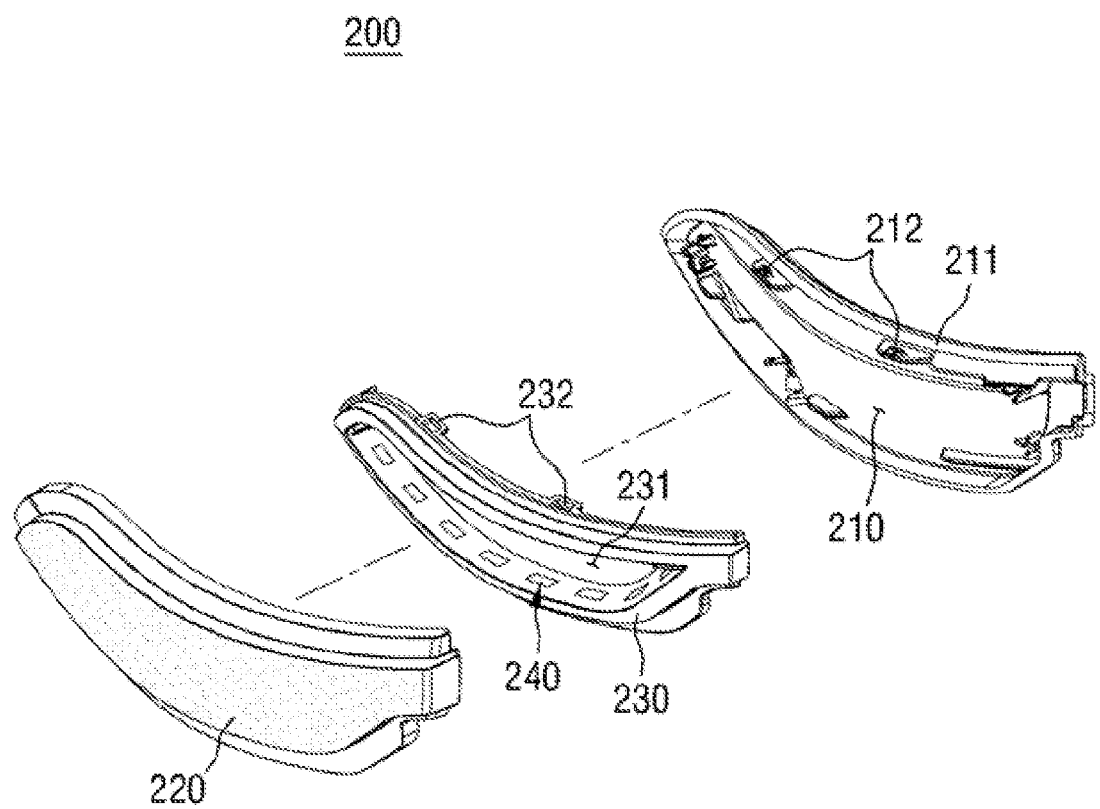
FIGS. 3 and 4 are exploded perspective views showing the signal lamp according to the embodiment of the present invention.
Figure 4:
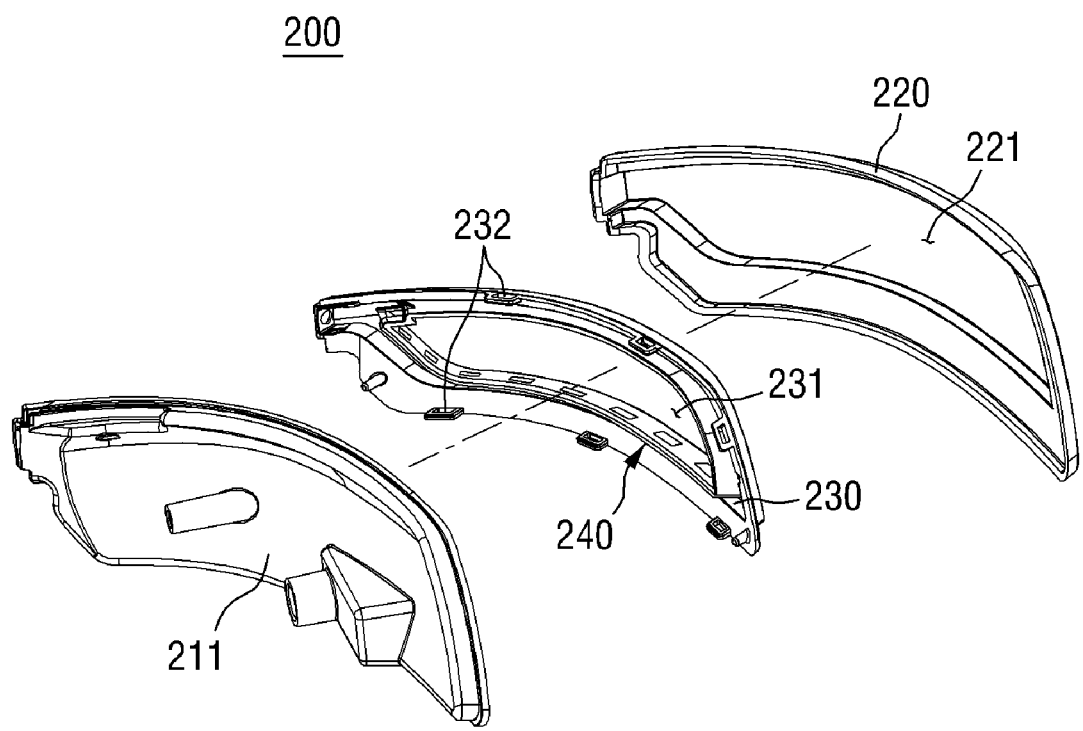
Figure 5:
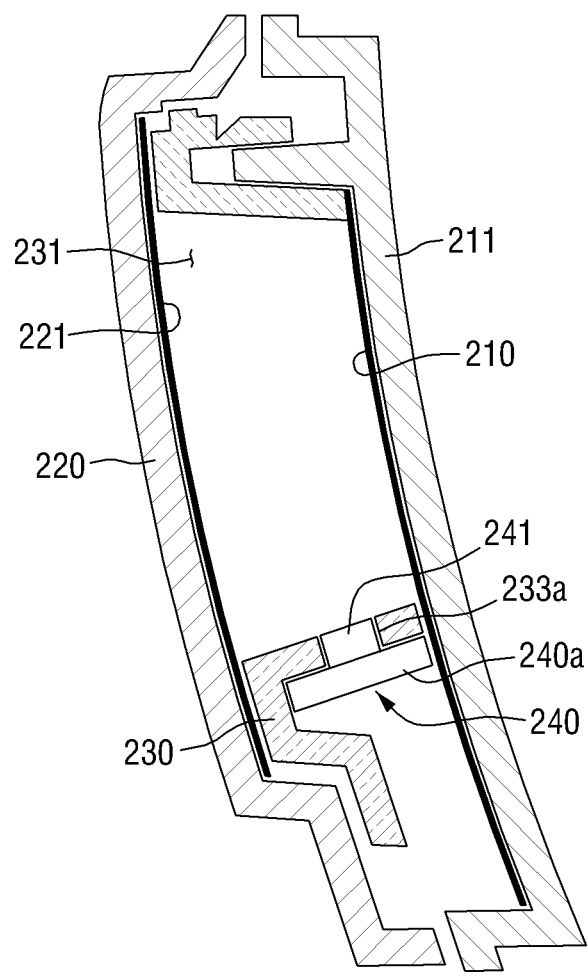
FIG. 5 is a cross-sectional view showing the signal lamp according to the embodiment of the present invention.

FIG. 2 is a perspective view of the signal lamp according to the embodiment of the present invention. FIGS. 3 and 4 are exploded perspective views showing the signal lamp according to the embodiment of the present invention. FIG. 5 is a cross-sectional view showing the signal lamp according to the embodiment of the present invention.

As shown, the signal lamp 200 according to the embodiment of the present invention may include a reflecting portion 210, a lens unit 220, a supporting portion 230 and a light source unit 240.

The reflecting portion 210 may reflect light generated from the light source unit 240 toward the lens unit 220. In the embodiment of the present invention, a case where the reflecting portion 210 includes a metal coating layer having a high reflectance, such as a chromium coating layer, formed on one surface facing the lens unit 220 in a lamp housing 211 will be described by way of example, but the present invention is not limited thereto. In another embodiment, for example, the reflecting portion 210 may be formed separately from the lamp housing 211 and may be located at one side of the lamp housing 211 to reflect light.

If the reflecting portion 210 is formed separately from the lamp housing 211, the reflecting portion 210 may be located at one side of the lamp housing 211 via hook coupling, screw coupling, an adhesive or the like, but the present invention is not limited thereto. In another embodiment, for instance, the reflecting portion 210 may be supported by a separate component formed so as to support the reflecting portion 210, and located at one side of the lamp housing 211 to be spaced apart from the lamp housing 211 by a predetermined distance.

A half mirror 221 may be formed on at least a surface of the lens unit 220. In the embodiment of the present invention, a case where the half mirror 221 is formed on a portion of the inner surface facing the reflecting portion 210 will be described by way of example, but the present invention is not limited thereto. In another embodiment, for example, the half mirror 221 may be formed on at least a portion of an outer surface of the lens unit 220.

The half mirror 221 may reflect at least a part of incident light and transmit the other part thereof. In some embodiments, a metal coating layer such as a chromium coating layer and an aluminum coating layer, or a metal oxide layer may be formed on the half mirror 221. The metal coating layer may be formed by any method know or to be known (e.g., spin coating, spray coating, sputtering, deposition, vacuum deposition, and plasma deposition). Further, the half mirror 221 may be attached to the lens unit 220 in the form of a separate film as well as the metal coating layer.

The supporting portion 230 has an opening 231 of a predetermined size. The supporting portion 230 may be located between the reflecting portion 210 and the lens unit 220. In some embodiments, the light source unit 240 may be installed in at least a portion of the peripheral edge of the opening 231, and may include a plurality of light sources arranged along the peripheral edge of the opening 231.

Further, at least one coupling groove 232 may be formed on the peripheral edge of the supporting portion 230 and may be engaged with at least one engaging protrusion 212 formed on the lamp housing 211 such that the supporting portion 230 can be hook-coupled to the lamp housing 211.

Figure 6:
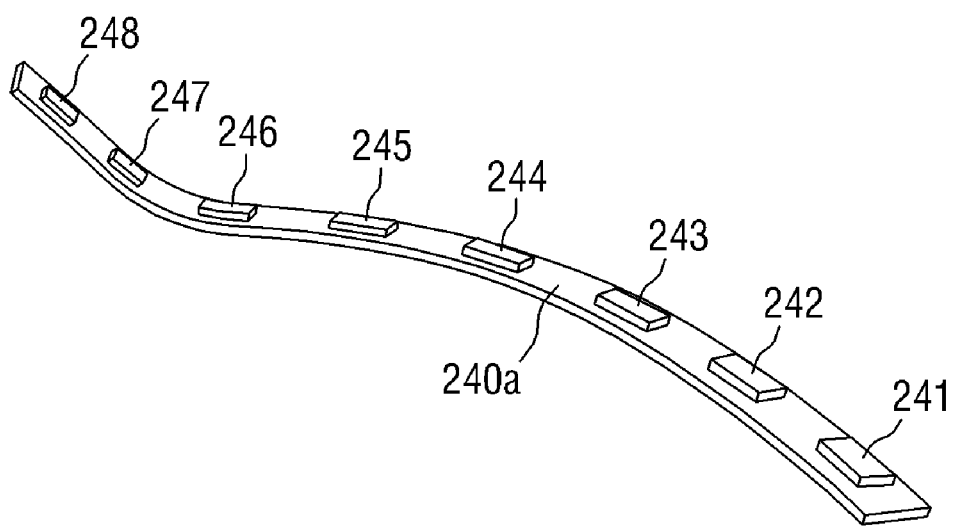
FIG. 6 is a perspective view showing a light source unit of the signal lamp according to the embodiment of the present invention.
Figure 7:
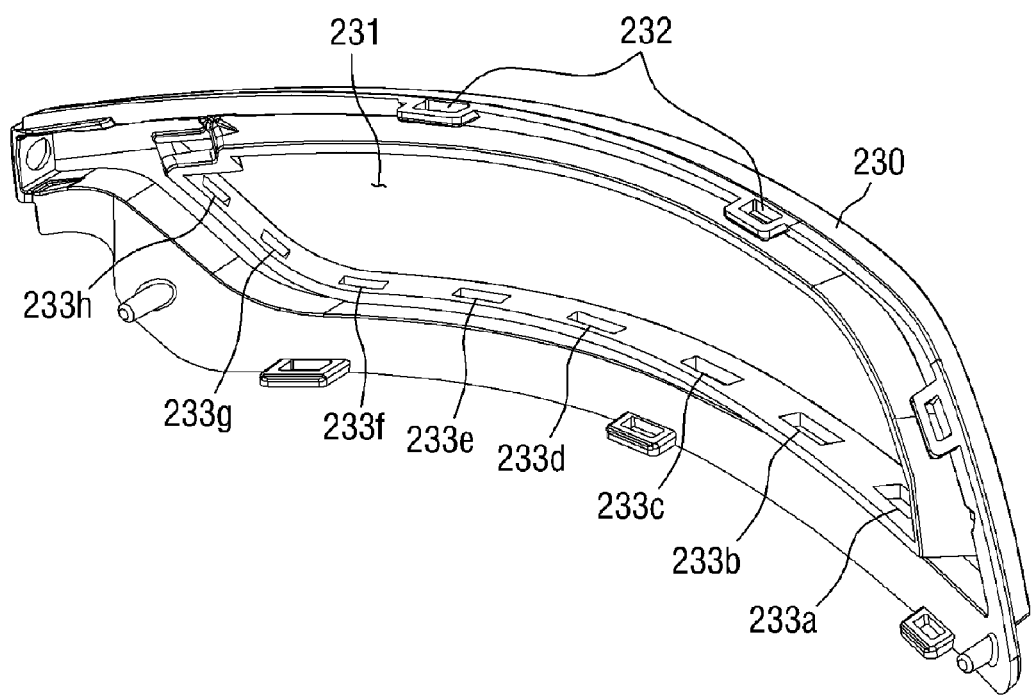
FIG. 7 is a perspective view showing a light guide structure and a supporting portion of the signal lamp according to the embodiment of the present invention.

The light source unit 240 installed on the peripheral edge of the supporting portion 230 may include, as shown in FIG. 6, a plurality of light sources 241 to 248 arranged in a predetermined direction according to the shape of at least a portion of the peripheral edge of the opening 231. At the peripheral edge of the opening 231, as shown in FIG. 7, a plurality of exposure holes 233a to 233h may be formed to expose the light sources 241 to 248 toward the opening 231. The number of light sources included in the light source unit 240 and the number of exposure holes corresponding thereto may be variously changed depending on the layout of the signal lamp 200, the amount of light required, or the like.

In the embodiment of the present invention, a case where LEDs are used as the light sources 241 to 248 will be described by way of example, but the present invention is not limited thereto, and various types of light sources such as bulbs may be used.

Figure 8:
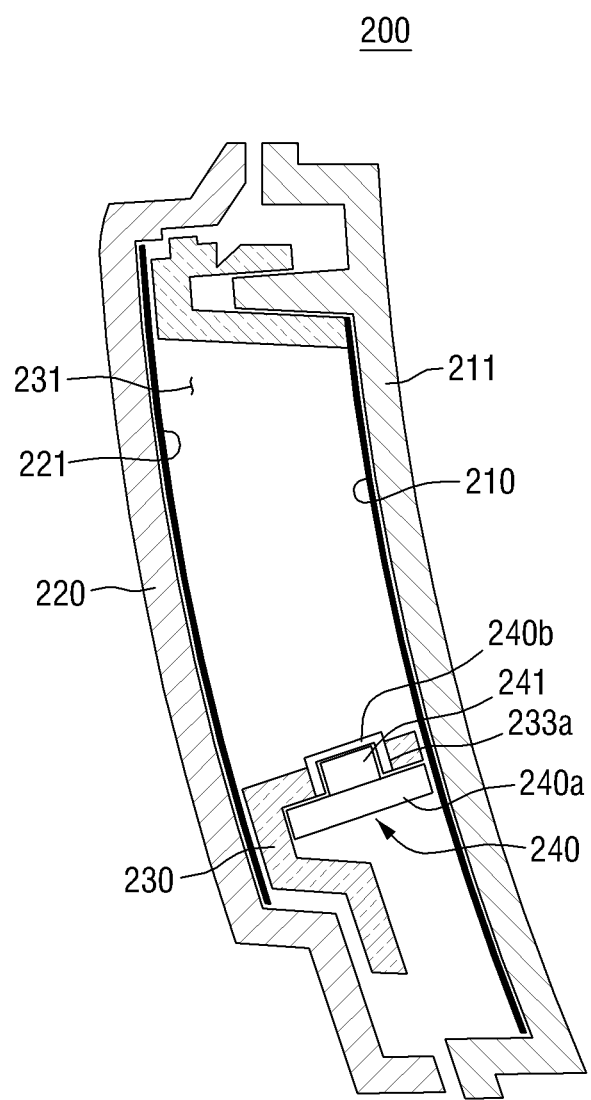
FIG. 8 is a cross-sectional view showing a signal lamp according to another embodiment of the present invention.

In the embodiment of the present invention, a case where the light sources 241 to 248 generate light directly through the exposure holes 233a to 233h, respectively, as shown in FIG. 5 will be described by way of example, but the present invention is not limited thereto. The light sources 241 to 248 may generate light through an inner lens 240b located on the light emitting surface side of the light sources 241 to 248 as shown in FIG. 8. The inner lens 240b may generate light with uniform brightness as a whole by diffusing the light generated from the light sources 241 to 248. A predetermined shape or pattern for diffusion of light may be formed on the inner lens 240b.

Meanwhile, the description of FIGS. 5 and 8 has been made using the light source 241 that is one of the light sources 241 to 248 and the exposure hole 233a corresponding thereto as an example, but the same can be applied to the other light sources 242 to 248.

Further, in the embodiment of the present invention, a case where the light source unit 240 is configured such that the plurality of light sources 241 to 248 are formed on a single substrate 240a in accordance with the intervals of the plurality of exposure holes 233a to 233h as shown in FIG. 6 will be described by way of example, but the present invention is not limited thereto. In another embodiment, each of the light sources 241 to 248 may be formed on a separate substrate, and the inner lenses may be formed respectively in accordance with the intervals of the plurality of exposure holes 231a to 231h, or may be formed integrally.

In the signal lamp 200 described above, by providing the reflecting portion 210 and the half mirror 221, the inside of the signal lamp 200 is not observed with the naked eye from the outside in a state where the light source unit 240 is turned off. On the other hand, the signal lamp 200 performs the function of the lamp in a state where the light source unit 240 is turned on when driving at night. Thus, it is possible to implement different appearance designs during day and night driving.

That is, the signal lamp 200 according to the embodiment of the present invention may form repeated images I as shown in FIG. 1 by repeatedly reflecting light generated from the light source unit 240 between the reflecting portion 210 and the half mirror 221.

Figure 9:
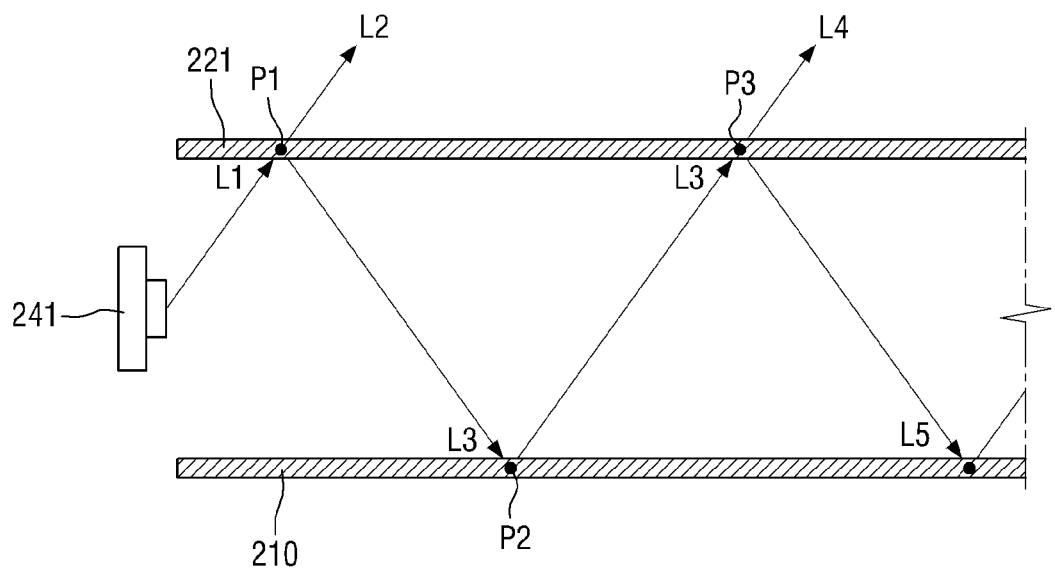
FIG. 9 is a schematic diagram showing an optical path of the signal lamp according to the embodiment of the present invention.

For example, in the signal lamp 200 according to the embodiment of the present invention, as shown in FIG. 9, when the light generated from the light source 241 that is one light source included in the light source unit 240 is incident on a first point P1 of the half mirror 221, light L2 that is at least a part of the incident light proceeds to transmit through the lens unit 220, and light L3 that is the other part of the incident light is reflected and directed to the reflecting portion 210.

The light L3 reflected by the half mirror 221 is incident on a second point P2 of the reflecting portion 210. Then, the light L3 is reflected again to the half mirror 221 and is incident on a third point P3 of the half mirror 221. Then, light L4 that is at least a part of the light incident on the third point P3 proceeds to transmit through the lens unit 220, and light L5 that is the other part of the incident light is reflected and directed to the reflecting portion 210.

In this case, an image formed by the light L2 which proceeds to transmit through the first point P1 of the half mirror 221 can be considered as an original image, and an image formed by the light L4 which proceeds to transmit through the third point P3 of the half mirror 221 can be considered as a reflected image obtained by reflecting the original image. Accordingly, it can be understood that the repeated images I of FIG. 1 include the original image of the light source unit 240 and one or more reflected images obtained by reflecting the original image.

Further, a case where each of the original image and the reflected image is formed as a single image has been described as an example with reference to FIG. 9 in the above-described embodiment, but it is a mere example to assist the understanding of the present invention, and the present invention is not limited thereto. In another embodiment, for example, a plurality of reflected images may be formed depending on the size of the reflecting portion 210 and the half mirror 221.

As described above, in the embodiment of the present invention, the repeated images I may be formed by repeatedly transmitting and reflecting the light between the reflecting portion 210 and the half mirror 221. In the above-described example of FIG. 9, since the amount of the light L4 transmitted through the third point P3 is not greater than or smaller than the amount of the light L2 transmitted through the first point P1, the light L4 has relatively low brightness. Thus, as described above with reference to FIG. 1, the repeated images I formed by the signal lamp 200 may have the brightness which gradually decreases toward the inside from the outside.

As a result, the signal lamp 200 according to the embodiment of the present invention may form the repeated images I as described with reference to FIG. 1 by repeatedly performing the process of transmission and reflection as described with reference to FIG. 9.

Meanwhile, a case where the light sources 241 to 248 included in the light source unit 240 are turned on/off at the same time to form the repeated images I has been described as an example in the above embodiment, but the present invention is not limited thereto. In another embodiment, for example, as a method of turning on the light sources 241 to 248, the light sources 241 to 248 may be turned on sequentially or the amount of light may be changed gradually after the light sources 241 to 248 are turned on at the same time. Hereinafter, the respective methods will be described below.

First, in the case of sequentially turning on the light sources 241 to 248, two or more adjacent light sources among the light sources 241 to 248 included in the light source unit 240 may be formed as a group, and the light source groups may be turned on in sequence.

Figure 10:
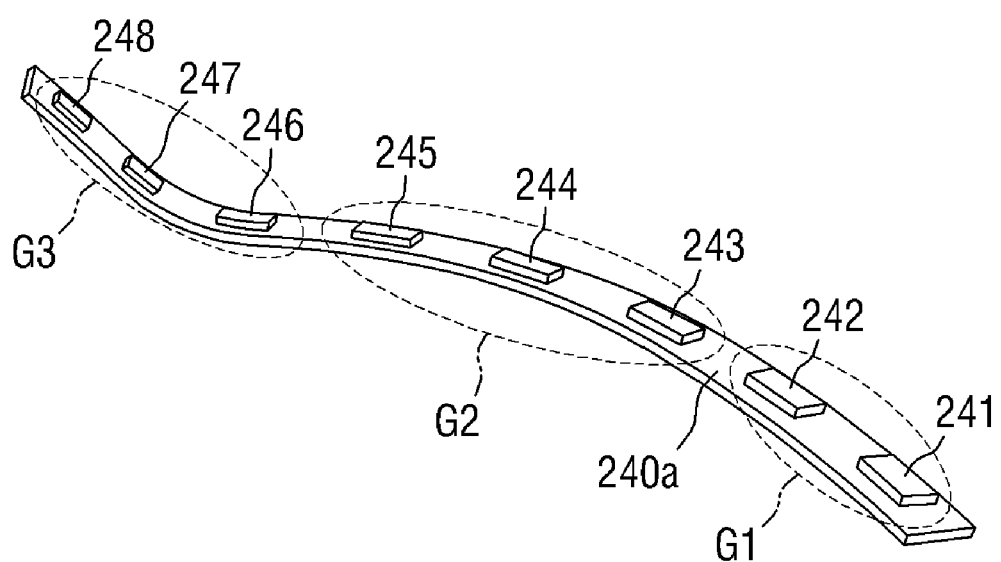
FIGS. 10 and 11 are schematic diagrams showing a lighting method of the light source unit of the signal lamp according to the embodiment of the present invention.

For example, a plurality of groups G1, G2 and G3 may be formed such that two or more adjacent light sources among the light sources 241 to 248 are included in each group as shown in FIG. 10. Then, the groups G1, G2 and G3 may be turned on sequentially within a predetermined period (e.g., 200 ms).

For example, if the groups are referred to as a first group G1, a second group G2 and a third group G3, the first group G1, the second group G2 and the third group G3 may be turned on sequentially for a predetermined period, the intervals at which the groups G1, G2 and G3 are turned on sequentially may vary depending on the number of the light sources or the period.

If the sequential lighting of the groups G1, G2 and G3 has been completed, that is, if all of the light sources 241 to 248 are turned on, the light sources 241 to 248 may be turned off at the same time.

In the embodiment of the present invention, a case where two or more adjacent light sources are formed as a group and the light source groups are turned on sequentially has been described as an example, but it is a mere example to assist the understanding of the present invention, and the present invention is not limited thereto. In another embodiment, each group may be formed of one light source. Also in this case, similarly to the above-described embodiment, the respective groups may be turned on sequentially within a predetermined period.

Figure 11:
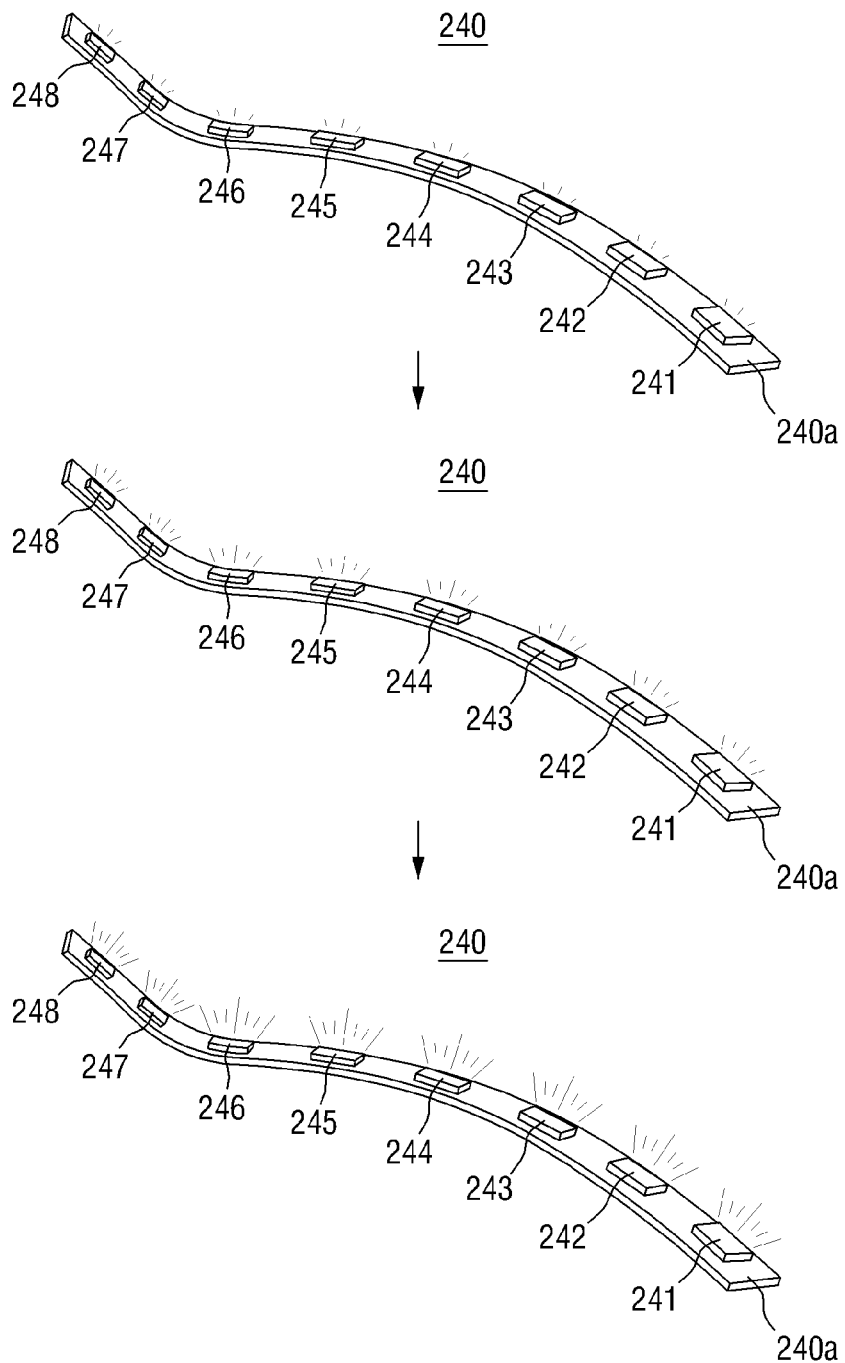

On the other hand, in the case of gradually changing the amount of light after the light sources 241 to 248 are turned on at the same time, after the light sources 241 to 248 are turned on at the same time, the amount of light increases gradually for a predetermined period (e.g., 200 ms), and the light sources 241 to 248 may be turned off after the amount of light reaches a target amount. In this case, it can be understood that the amount of light increases as the length of lines illustrated on the light emitting surface side of each of the light sources 241 to 248 in FIG. 11 becomes longer.

For example, if an initial amount of light is 30% and a target amount of light is 100% when the light sources 241 to 248 are turned on at the same time, the amount of light from the light sources 241 to 248 may increase from 30% to 100% at predetermined time intervals, and the light sources 241 to 248 may be turned off when the amount of light reaches 100%. In this case, the time intervals at which the amount of light is changed within a predetermined period may vary depending on the stages at which the amount of light is changed from the initial amount of light to the target amount of light.

The methods of turning on the light sources 241 to 248 are merely examples to assist the understanding of the present invention, and the present invention is not limited thereto. The above-described methods may be used in combination, and various methods may be used in addition to the above-described methods.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A lamp for a vehicle, comprising:
   a mirror housing accommodating a mirror therein;
   a lamp housing that includes at least one engagement portion provided on a portion of an outer surface of the lamp housing;
   a lens unit that is coupled to the lamp housing so as to form a chamber between the lens unit and the lamp housing and includes a half mirror disposed on a surface portion of the lens unit;
   a supporting portion including a peripheral edge defining an opening therein, wherein the peripheral edge is provided with at least one engaging portion configured to be hook-coupled to the engaging portion of the lamp housing; and
   one or more light sources that are disposed along the peripheral edge of the supporting portion, wherein the peripheral edge of the supporting portion extends along a peripheral edge of the lens unit, and
   wherein when the light sources are turned on, a light pattern having multiple repeated images is formed, the repeated images including an original image that is formed by the light sources and at least one reflected image obtained by reflection of the original image, and
   wherein the original image is disposed at an end of the repeated images and the at least one reflected image is disposed side by side next to the original image in a predetermined direction.

2. The lamp of claim 1, wherein the lamp housing is provided on at least a portion of a front side of the mirror housing, on at least a portion of a lateral side of the mirror housing, or on both.

3. The lamp of claim 1, wherein a reflection portion is disposed on a surface portion of the lamp housing and the reflecting portion includes a metal coating layer formed on at least a portion of a surface of the lamp housing.

4. The lamp of claim 1, wherein the half mirror includes a metal coating layer formed on at least a portion of a surface of the lens unit, or is attached to the lens unit in the form of a film.

5. The lamp of claim 1, wherein the half mirror is formed on at least a portion of an inner surface of the lens unit, on at least a portion of an outer surface of the lens unit, or on both.

6. The lamp of claim 1, wherein a plurality of exposure holes are formed in the supporting portion to expose the plurality of light sources along the peripheral edge of the opening.

7. The lamp of claim 6, wherein the light sources generate light through an inner lens provided on or near the light sources.

8. The lamp of claim 1, wherein the light sources are classified into a plurality of groups, each group including one or more light sources, and the plurality of groups are turned on sequentially in a predetermined direction.

9. The lamp of claim 8, wherein the plurality of groups are turned on and off for a predetermined period, and the plurality of groups are turned on sequentially within the period and turned off after all the groups are turned on.

10. The lamp of claim 1, wherein the plurality of light sources are turned on and off for a predetermined period, and
    wherein an amount of light from the light sources is gradually changed within the period, and the light sources are turned off if the amount of light reaches a target amount.

11. The lamp of claim 1,
    wherein a reflection portion is disposed on a surface portion of the lamp housing and the reflecting portion and the half mirror have the same curvature or are parallel to each other.

* * * * *